United States Patent Office 3,438,928
Patented Apr. 15, 1969

3,438,928
SOLUTIONS OF POLYALKYLQUINOZOLONE
Paul Etienne Lateltin and Maurice Jules Arthur Mallet, Lyon, France, asignor to Phone-Poulenc S.A.
No Drawing. Filed Aug. 8, 1966, Ser. No. 570,723
Claims priority, application France, Aug. 12, 1965, 28,182; May 27, 1966, 63,365
Int. Cl. C08g 51/34
U.S. Cl. 260—33.4                               5 Claims

ABSTRACT OF THE DISCLOSURE

The invention provides novel solutions of controlled viscosity containing up to 30% of polyalkylquinazolones in aromatic alcohols as solvent.

---

This invention relates to polyalkylquinazolones, and more specifically to a novel method which permits the utilization of polyalkylquinazolones for the preparation of wires, films, sheets and similar articles. The invention also relates to the novel solutions of polyalkylquinazolones prepared as described herein.

The polyalkylquinazolones are polymeric substances characterized by the presence of both aromatic and heterocyclic rings. They are thermohardenable, infusible polymers, of great value in the preparation of articles which have to withstand high temperatures, during usage.

Polyalkylquinazolones may be synthesized by condensation of essentially equimolar quantities of an aromatic diamine and a bifunctional heterocyclic compound which contains two oxazinone nuclea. For instance, an aromatic diamine may be condensed by conventional methods with a 6,6-bi-(4H-2-alkyl-3,1-bezoazin-4-one) of Formula I below.

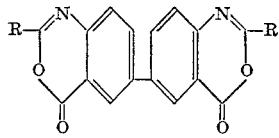

R in Formula I stands for a lower alkyl group containing between 1 and 4 carbon atoms. The 6,6-bi-(4H-2-alkyl-3,1-benzoxazin-4-one) compounds may be prepared by reaction of acid anhydrides with aromatic aminocarboxylic acids, for instance, bis-anthranilic acid, as described in the publication by G. de Gaudemaris and all. Bull. Soc. Chim. France, 171–176 (1965).

Polyalkylquinazolones have also been reported by Serlin and Markhart, J. Polymer Science 60, S-59 (1962), by condensation of bis(p-aminophenyl)ether with benzdi(oxazin-4-ones), of formula

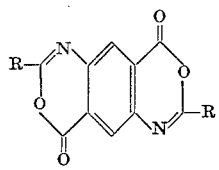

in which R repersents a lower alkyl radical. The benzdi(oxazin-4-ones) starting materials are prepared from aromatic diaminodicarboxylic acids.

As already mentioned above, polyalkylquinazolones are infusible products, stable at temperature as high as 300°– 325° C., even for a period of several hours. In spite of these valuable properties, the use of polyalkylquinazolones in commercial applications has been accompanied by many difficulties. The main reason is that polyalkylquinazolones are insoluble in the common solvent, including aliphatic, cycloaliphatic and aromatic hydrocarbons, aliphatic ketones, chlorinated solvents, open-chain and cyclic ethers, dimethylformamide and dimethylsulfoxide.

The only known substance which may be used as a solvent for polyalkylquinazolones is metacresol. The metacresol solutions of polyalkyquinazolones, however, have limited applicability because their viscosity increases rapidly with the increased concentration of the polymer. At a concentration of 20% or higher, the viscosity of the polyalkylquinazolone solutions in metacresol is so high, that the solutions may not be used in connection with the conventional methods of casting, dipping, coating and lining.

An object of this invention is to provide a method for the preparation of solutions of polyalkylquinazolones which are suitable for the manufacture of wires, films and sheets, by the conventional methods known in the art.

Another object is to provide a method for controlling the viscosity of polyalkylquinazolone solutions, in organic solvents, without affecting the solubility of the polymeric substances in the same organic solvents.

Still another object is to provide solvents for polyalkylquinazolones, which may consist either of one individual chemical substance or of two or more substances, and which have solvent power for polyalkyquinazolones over a wide temperature range, including room temperature.

The crux of this invention resides in the finding that satisfactory solutions of polyalkylquinazolones may be obtained, if a solvent system is used which comprises at least one aromatic alcohol. The term "aromatic alcohol," as used herein, designates any compound which contains an aromatic ring and an alcoxy group, not directly attached to the aromatic ring. More specifically, benzyl alcohol, anisyl alcohol, that is, 4-methoxy benzyl alcohol, cuminyl alcohol, that is 4-isopropyl benzyl alcohol, α- and β-phenyl ethanol and in general aromatic alcohols, which are substituted with alkyl or alcoxy-groups, in the aromatic ring, may be used.

Although some of the aromatic alcohols within the scope of this invention, such as benzyl alcohol, anisyl alcohol, or α-phenyl ethanol have solvent power for polyalkylquinazolones even at room temperature, it is advantageous to apply some heat in order to dissolve the polyquinazolones rapidly and in order to achieve a higher concentration of the polyalkylquinazolones in solution. For instance, in the case of bezyl alcohol, it is possible to obtain solutions of concentration as high as 25% and even 30%, by heating at 150°–200° C. The solutions obtained in this manner, are homogeneous and deeply colored.

According to a more specific embodiment of this invention, it is possible to facilitate dissolution of the polyalkylquinazolones in certain aromatic alcohols, such as cuminyl alcohol, which have no solvent power for polyalkylquinazolones at room temperature and which ordinarily require heating, by the use of mixtures of solvents. Thus, a mixture of two aromatic alcohols may be used, such as cuminyl alcohol and benzyl alcohol. It is also possible to use a mixture of the two aromatic alcohols with a third substance, which may be, for instance, an aromatic hydrocarbon or a phenol. In view of the fact that metacresol is a solvent for polyalkylquinazolones, and that it is miscible with benzyl alcohol, it is possible to prepare mixtures of solutions of polyalkylquinazolones in benzyl alcohol and in metacresol, respectively, or to dissolve the polyalkylquinazolones in mixtures of these solvents.

By way of example, mixtures of benzyl or anisyl alcohol and metacresol, in all proportions, are good solvents for polyalkylquinazolones, not only by heating, but even at room temperature. It has also been found that mixtures of cuminyl and benzyl alcohol, in the proportion of 60 parts of the former to 40 parts of the latter, are good solvents, for polyalkylquinazolones and no heat is required.

According to another more specific embodiment of the invention, a mixture of anisyl alcohol, cuminyl alcohol and metacresol, in the proportion of 20:60:20, dissolves the polyalkylquinazolones even at room temperature. Manifestly, it is possible to prepare solutions of polyalkylquinazolones in different solvents, and then mix the solutions already prepared in the desired proportions.

The advantages of this invention, namely, that aromatic alcohols exhibit solvent power for polyalkylquinazolones, are unexpected and surprising, in view of the fact that many alcohols, such as methanol, ethanol, isopropyl alcohol, butanol, 1,2-propanediol and even phenyl glycol and cyclohexanol have no solvent power for polyalkylquinazolones. On the other hand, in accordance with this invention, that is, the use of aromatic alcohols, it is possible to obtain solutions of polyalkylquinazolones of concentration between 10 and 25%, which are suitable for use in connection with conventional methods of casting, coating, impregnation and extrusion.

In some instances, if the viscosity of the solutions prepared as described herein, is too high, it is possible to lower it by dilution with a solvent of boiling point lower than the aromatic alcohol, for instance, ether, chloroform and xylene. By way of example, a 20% solution of polyalkylquinazolones in benzyl alcohol has viscosity in the range of 400 stokes. If, however, xylene is added, in the ratio of 40 parts of xylene to 60 parts of benzyl alcohol, a colloidal solution of polyalkylquinazolones is obtained, of 17% concentration, which has viscosity not exceeding 100 stokes, and which is very suitable for the insulation of electrical films by enameling. Manifestly, the substance which has no solvent power towards the polyalkylquinazolones but which is added merely to lower the viscosity of the solutions, must be added in limited proportions, so that the solubility of the polyalkylquinazolones in the solvent mixtures is not substantially affected.

The polyquinazolone solutions prepared in accordance with this invention, are more suitable than the solutions in metacresol for use in connection with the common methods of application, involving impregnation, coating, lining, enameling and preparation of films by casting. The hardening of the resin occurs on the article itself, by heating during the step of evaporation of the solvent.

In accordance with the specific ultimate use which is being contemplated, it may be advantageous to incorporate into the solutions some additives, such as pigments and plastifiers. The choice of the additive, in each instance, depends upon two main factors, (1) the compatibility of the additive with the polyalkylquinazolones and (2) their stability to the high temperature to which the polyalkylquinazolones are exposed.

The following examples are described in detail, for the purpose of better understanding of the invention.

EXAMPLE 1

The polyalkylquinazolone is prepared by reaction of equimolar quantities of bis-p-aminophenyl ether dissolved in metacresol and 6,6-bi-(4H-2-methyl-3,1-benzoxazin-4-one) according to the procedure described by G. de Gaudemaris and all.

Seventy-five grams of the polymer, in the form of a powder of intrinsic viscosity 1.09, are placed in a one-liter flask, provided with a mechanical stirrer, and 425 g. of benzyl alcohol are added. The mixture is heated to 150°–155° C., until dissolution is complete, which occurs in a short period of time. The resulting solution is filtered at 140° C., and degasified by heating at 80° C. for a period of 12 hours. It is perfectly clear, and the concentration by analysis is 15%. This solution is poured onto a glass plate, and leveled by means of a suitable spreading device, to give a film, which is dried in an oven at 140° C., for a period of six hours. The resulting transparent film of high gloss, exhibits resistance to traction of 9 kg./mm.$^2$ and breaking elongation of 10%.

EXAMPLE 2

Sixty grams of the same polymer used in Example 1, but of intrinsic viscosity 1.2, are dissolved in 250 g. of benzyl alcohol, under the same conditions used in Example 1. A copper wire, of 0.8 mm. diameter, is allowed to run through the solution, at a rate of 5 meters per minute, and then passed through an oven kept at 280° C. The operation is repeated until the thickness of the polymer layer deposited on the wire is 0.05 mm. The resulting enameled wire is characterized, not only by excellent electrical insulation, but also by a very good resistance to abrasion and to temperatures as high as 300° C., for a very long period of time.

EXAMPLE 3

Forty-nine grams of anisyl alcohol and 8 g. of polymethylquinazolone in powder form, of viscosity 2.13, prepared by reaction of equimolar quantities of 6,6-bi-(4H-2-methyl-3,1-benzoxazin-4-one) and of bis-p-aminophenyl ether, are placed in a 250 cc. flask, provide with a mechanical stirrer. The mixture is heated up to 130°–135° C., under stirring, until dissolution is complete. The polymer goes into solution rapidly. The resulting solution is filtered at 120° C., degasified at 100° C. for a period of 12 hours. The resulting clear solution, of 14% concentration, is poured onto a glass sheet, and leveled with a suitable spreading device, to give a film which is dried in an oven at 13° C., for a period of six hours. The film so obtained is transparent, has high gloss and a resistance of 10.5 kg./mm.$^2$ and a breaking elongation of 100%.

An identical film is obtained by the use of α-phenyl ethanol instead of anisyl alcohol.

EXAMPLE 4

Glass fiber, previously treated with a coating of γ-aminopropylsilane, is impregnated with a polyquinazolone solution in benzyl alcohol of 10% concentration in such a manner that the glass fiber retains the solution in amount corresponding to 21% og its weight. Sixteen sheets of the impregnated fibers are stacked, one over the other, heated at 155° C., for 30 minutes, and then heated one additional hour at 225° C., under a pressure of 18 kg./cm.$^2$, while maintaining the assembly between the trays of a press. A laminated sheet is obtained, which has a flexion breaking resistance of 34 kg./mm.$^2$, in terms of the standard AFNOR T51 001. After exposure to an oxidizing atmosphere, at temperature of 250° C., for 500 hours, the flexion breaking resistance is still 20 kg./mm.$^2$.

Although only four examples have been described in detail, those skilled in the art will readily visualize that several variations of the specific embodiments covered in the examples are possible, and that mixtures of solvents in different proportions may be used without departing from the scope of the invention which is to be limited only by the appended claims.

What is claimed is:

1. A solution of a polyalkylquinazolone in which each alkyl is of 1 to 4 carbon atoms of concentration up to 30% in a solvent comprising an aromatic alcohol selected from the group consisting of benzyl alcohol, anisyl alcohol, cuminyl alcohol, α- and β-phenylethanol and mixtures thereof.

2. A solution according to claim 1 wherein a mixture of cuminyl alcohol and benzyl alcohol is used as a solvent.

3. A solution according to claim 1 additionally comprising an aromatic hydrocarbon in an amount up to 40% by volume but insufficient to cause precipitation of the polymer.

4. A solution according to claim 1 wherein said aromatic alcohol is selected from the group consisting of benzyl alcohol and anisyl alcohol and mixtures thereof, and said solvent additionally includes up to about 20 percent metacresol.

5. A solution according to claim 1 wherein said aromatic alcohol is a mixture of anisyl alcohol and cuminyl alcohol, and said solvent additionally includes up to about 20 percent metacresol.

References Cited

Serlin et al.: New Linear Heterocyclic Polymers: Polypyrimidonequinazolones, "Journal of Polymer Science," vol. 60, 1962, pages S59–S63.

MORRIS LIEBMAN, *Primary Examiner.*

L. T. JACOBS, *Assistant Examiner.*

PO-1050
(5/69)

UNITED STATES PATENT OFFICE
CERTIFICATE OF CORRECTION

Patent No. 3,438,928      Dated April 15, 1969

Inventor(s) Paul Etienne Lateltin & Maurice Jules Arthur Mallet

It is certified that error appears in the above-identified patent and that said Letters Patent are hereby corrected as shown below:

> Column 1, line 5, delete "Phone-Poulenc" and insert --Rhone-Poulenc--

SIGNED AND
SEALED
NOV 18 1969

(SEAL)
Attest:

Edward M. Fletcher, Jr.
Attesting Officer

WILLIAM E. SCHUYLER, JR.
Commissioner of Patents